United States Patent
Iio et al.

(10) Patent No.: US 6,467,509 B1
(45) Date of Patent: Oct. 22, 2002

(54) FUEL HOSE

(75) Inventors: Shinji Iio, Komaki (JP); Hiroaki Ito, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/143,948

(22) Filed: May 14, 2002

(30) Foreign Application Priority Data

May 15, 2001 (JP) ........................................ 2001-144134
Apr. 10, 2002 (JP) ........................................ 2002-107662

(51) Int. Cl.$^7$ .............................................. F16L 11/00
(52) U.S. Cl. ....................... 138/137; 138/140; 138/141; 138/DIG. 7
(58) Field of Search ................................. 138/137, 140, 138/141, 145, 146, DIG. 7

(56) References Cited

U.S. PATENT DOCUMENTS

| | | | | |
|---|---|---|---|---|
| 5,196,460 A | * | 3/1993 | Lora et al. ..................... | 524/72 |
| 5,469,892 A | * | 11/1995 | Noone et al. ................ | 138/121 |
| 5,476,121 A | * | 12/1995 | Yoshikawa et al. .......... | 138/127 |
| 5,488,975 A | * | 2/1996 | Chiles et al. ................ | 138/124 |
| 5,560,398 A | * | 10/1996 | Pfleger ........................ | 138/121 |
| 5,588,468 A | * | 12/1996 | Pfleger ........................ | 138/121 |
| 6,089,278 A | * | 7/2000 | Nishino et al. .............. | 138/137 |
| 6,170,535 B1 | * | 1/2001 | Sadr et al. ................... | 138/137 |
| 6,279,615 B1 | * | 8/2001 | Iio et al. ..................... | 138/137 |

FOREIGN PATENT DOCUMENTS

| | | |
|---|---|---|
| JP | 06-255004 | 9/1994 |
| JP | 08-118549 | 5/1996 |
| JP | 08/169085 | 7/1996 |
| JP | 11-082822 | 3/1999 |

\* cited by examiner

*Primary Examiner*—Patrick Brinson
(74) *Attorney, Agent, or Firm*—Jacobson Holman PLLC

(57) ABSTRACT

A fuel hose comprising a rubber layer and a fluororesin layer formed on the inner surface of the rubber layer, in which the adhesion to the fluororesin layer is improved by blending from 2 to 15 phr of a phenol-type resin with the rubber forming the rubber layer. Phenol resins of a specific polymeric structure are particularly preferred as the phenol-type resins. A fluororesin layer formed by melting a fluororesin and allowing it to adhere to the inner surface of the rubber layer by powder coating is particularly preferred. The provision of the fluororesin layer on the inner surface of the rubber layer enables simple and effective adhesion of the thinned fluororesin layer to the rubber layer.

20 Claims, 2 Drawing Sheets

# FUEL HOSE

BACKGROUND OF THE INVENTION

1. Field of the Invention

The present invention relates to a fuel hose having at least a rubber layer and a fluororesin layer formed on the inner surface thereof. The fuel hose of the invention is favorably used, for example, as a fuel hose for automobiles and exhibits excellent performance particularly for alcohol-containing gasoline and sour gasoline.

2. Description of the Related Art

In recent years, control led evaporation of fuel to the air has been demanded in relation to environmental pollution. Therefore, the fuel permeability of the fuel hose for automobiles has been more and more strictly regulated. Conventional fuel hoses prepared only from NBR/PVC have been unable to cope fully with such fuel permeation regulation. Further, the alcohol-containing gasoline used to purify automobile exhaust shows high permeation as compared with gasoline containing no alcohol. A fuel hose having further lower permeability to fuel has therefore been expected. Furthermore, when an automobile is left to stand for a long period of time, the gasoline may be compelled to remain in the gasoline tank for a long time to deteriorate the gasoline. Thus, the fuel hose should have low permeability and high resistance to such deteriorated gasoline (sour gasoline) as well.

The provision of a fluororesin layer excellent in low fuel permeability and resistance to sour gasoline is considered very effective to meet these requirements. However, since fluororesin has poor flexibility and sealing properties at hose joints, a fuel hose formed of a fluororesin layer alone is not suitable. It is thus reasonable to provide a thinned fluororesin layer, preferably as an inner layer of the fuel hose, and a rubber layer as an outer layer thereof. When the fluororesin layer is not provided at end portions of the fuel hose in order to ensure the sealing, it is preferable to impart to the rubber layer characteristics such as the resistance to sour gasoline since the rubber layer at the end portions may contact the gasoline.

The invention disclosed in Japanese Patent Application Laid-Open No. 118549/1996 exemplifies a conventional technique relating to the fuel hose of this kind. In this technique, a rubber layer prepared from epichlorohydrin unvulcanized rubber blended with an organic phosphonium salt and a fluororesin layer formed by extrusion are laminated and subjected to vulcanization.

The invention disclosed in Japanese Patent Application Laid-Open No. 169085/1996 also exemplifies the conventional technique. In this technique, a fluororesin layer is extruded and laminated between an outer rubber layer and an inner rubber layer and then subjected to vulcanization. Th e outer rubber layer is formed of epichlorohydrin unvulcanized rubber blended with a salt of 1,8-diazabicyclo[5,4,0] undecene-7 (DBU salt) and an organic phosphonium salt, and the inner rubber layer is formed of unvulcanized NBR or unvulcanized fluororubber blended with the DBU salt or the organic phosphonium salt.

The invention disclosed in Japanese Patent Application Laid-Open No. 255004/1994 also exemplifies the conventional technique. In this technique, first, the inner surface of a vulcanized rubber tube undergoes a pretreatment for adhesion such as sodium etching treatment, corona discharge treatment, or low-temperature plasma treatment. Subsequently, the inner surface treated undergoes electrostatic coating by use of fluororesin powder, and is heated and cooled to prepare a fuel hose having a fluororesin layer on the inner surface of the rubber tube.

Fluoropolymers in general have a disadvantage of having weak adhesion to rubber materials, and fluororesins in particular are serious in this defect. In preparation of the fuel hose having a rubber layer formed on the outer surface of a thinned fluororesin layer, the adhesion of both layers presents a serious problem.

The aforesaid Japanese Patent Application Laid-Open Nos. 118549/1996 and 169085/1996 relating to the conventional techniques disclose vulcanization adhesion of the fluororesin layer to an unvulcanized rubber layer. That is, they do not disclose a technique allowing adhesion of the fluororesin layer to a rubber layer vulcanized already. When the fluororesin layer and the unvulcanized rubber layer are allowed to adhere by vulcanization, electrostatic powder coating of the fluororesin layer onto the unvulcanized rubber layer is difficult. Therefore, the formation of a good thin fluororesin layer by the electrostatic powder coating is also difficult.

The conventional technique of the aforesaid Japanese Patent Application Laid-Open No. 255004/1994 relates to a technical problem in adhesion of the thinned fluororesin layer to the vulcanized rubber layer. However, means for solving this problem is to perform a pretreatment for adhesion such as sodium etching treatment, corona discharge treatment, and low-temperature plasma treatment to the inner surface of the rubber layer. These pretreatments for adhesion complicate the production process to deteriorate production efficiency and production cost.

SUMMARY OF THE INVENTION

It is an object of the present invention to provide a simple and effective means for allowing a thin fluororesin layer to adhere to a vulcanized rubber layer in a fuel hose.

A first aspect of the invention provides a fuel hose comprising a rubber layer and a fluororesin layer adhering to the inner surface thereof, wherein rubber forming the rubber layer contains from 2 to 15 phr (parts per 100 parts of rubber) of a phenol-type resin.

The fuel hose of the first aspect has excellent resistance to fuel and resistance to permeation because of the fluororesin layer formed and particularly shows high reliability for the alcohol-containing gasoline and sour gasoline. Particularly when the innermost layer of the fuel hose is the fluororesin layer, the fuel hose exhibits the resistance to fuel most efficiently.

Since the rubber forming the rubber layer of the fuel hose contains from 2 to 15 phr of the phenol-type resin, adhesion to the fluororesin layer can be ensured without relying upon the vulcanization adhesion. Accordingly, first, the fuel hose can avoid troubles such as blocking of the flow path and reduction in vibration durability of the fuel hose caused by weak adhesion of the rubber layer to the fluororesin layer. Secondly, the formation of the thin fluororesin layer can be satisfactorily performed through the electrostatic powder coating, because it requires no extrusion which is needed in vulcanization adhesion Furthermore, resin in general tends to deteriorate in resin performance when adhesive agents are added thereto. In the first aspect, the phenol-type resin is added to the rubber forming the rubber layer, and no adhesion agent is added to the fluororesin forming the fluororesin layer, thus to avoid the deterioration in performance of the fluororesin layer.

When the content of the phenol-type resin in the rubber forming the rubber layer is less than 2 phr, adhesion to the fluororesin may be deteriorated, and the resistance of the rubber layer itself to the sour gasoline also tends to become insufficient, particularly when epichlorohydrin rubber is used. The content exceeding 15 phr may invite deterioration in mechanical properties, compression set, and low-temperature properties, although the resistance of the rubber layer itself to the sour gasoline is satisfactorily maintained.

In a second aspect of the invention, the fluororesin is melted and allowed to adhere to the inner surface of the rubber layer by the electrostatic powder coating, and thus the fluororesin layer according to the first aspect is formed.

In the second aspect, a good thin fluororesin layer is formed by the powder coating. Furthermore, the thin fluororesin layer can be formed with ease in an arbitrary form and at an arbitrary portion of the hose. The arbitrary form is, for example, a smooth tubular form, a corrugated form, or a tubular form having a concave portion for containing a seal ring or other concave and/or convex portions. The arbitrary portion of the hose is, for example, the entire inner surface of a tubular rubber layer or the inner surface excluding end portions of the inner surface of the tubular rubber layer.

Since the fluororesin layer can be shaped, for example, into a corrugated form as described above, the flexibility of the fuel hose is ensured with ease. Furthermore, since the fluororesin layer can be formed on the inner surface of the rubber layer excluding the end portions thereof, the sealing at the hose joints can be ensured with ease. Moreover, for example, when the concave portion for containing a seal rubber ring is formed on the end inner surface of the rubber layer, the fluororesin layer can also be formed on the concave portion with ease. Accordingly, the sealing can be ensured with ease while maintaining the low permeability to fuel.

In a third aspect of the invention, the thickness of the fluororesin layer according to the first or second aspect is from 0.05 to 0.5 mm. In the third aspect, the thickness of 0.05 mm or more makes it possible to ensure particularly effectively the resistance to fuel of the fuel hose and resistance to permeation of the fuel. The thickness of 0.5 mm or less makes it possible to ensure particularly fully the flexibility of the fuel hose.

In a fourth aspect of the invention, the phenol-type resins according to the first to third aspects are at lest one resin selected from the group consisting of a resol-type phenol resin, a novolak-type phenol resin, a resorcin resin, a resorcin-modified phenol resin, a cresol resin, a cresol-modified phenol resin, a terminal-modified p-alkylphenol-formaldehyde resin, a non-thermal reaction alkylphenol resin, a thermal reaction phenol resin, a cashew-modified phenol resin, an aromatic hydrocarbon resin-modified phenol resin, a melamine-modified phenol resin, an oil-modified phenol resin, a terpene-modified phenol resin, and a furan-modified phenol resin.

The phenol-type resins in the forth aspect are preferably used as phenol-type resins to be added to the rubber forming the rubber layer, and particularly the cashew-modified phenol resin is preferable.

In a fifth aspect of the invention, the phenol-type resins according to the first to third aspects are resins represented by the following formula (1). In formula (1), R represents a hydrocarbon group, and n is a positive integer. Formula (1)

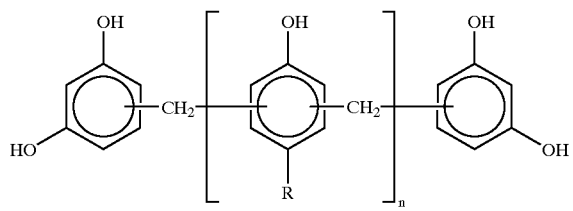

The phenol-type resins represented by formula (1) of the fifth aspect are particularly preferred as the phenol-type resins to be added to the rubber forming the rubber layer.

In a sixth aspect of the invention, the rubber forming the rubber layer according to the first to fifth aspects is NBR-PVC (blend of acrylonitrile-butadiene rubber with polyvinyl chloride), epichlorohydrin rubber, NBR (acrylonitrile-butadiene rubber), binary or ternary FKM (fluororubber), CPE (chlorinated polyethylene rubber), or CSM (chlorosulfonated polyethylene rubber).

The rubbers shown in the sixth aspect are preferable examples of the rubber forming the rubber layer of the fuel hose. Of the rubber, the epichlorohydrin rubber, which has ether linkages in the main chain, undergoes cleavage by peroxides with ease to cause softening and deterioration. Accordingly, the rubber inherently has very low resistance to deteriorated fuel (sour gasoline), but the resistance to sour gasoline has been remarkably improved by blending the phenol-type resins as described above.

In a seventh aspect of the invention, the fluororesin forming the fluororesin layer according to the first to sixth aspects is a copolymer of vinylidene fluoride (VDF) and chlorotrifluoroethylene (CTFE).

The powder of the fluororesin consisting of the copolymer of VDF and CTFE melts at a temperature that causes no thermal deterioration of the rubber layer. Furthermore, the rigidity of the fluororesin layer formed by melting the powder is not so high. Accordingly, the formation of the fluororesin layer by the electrostatic powder coating allows the rubber layer to avoid thermal deterioration and in addition allows the fuel hose to maintain flexibility.

In an eighth aspect of the invention, the VDF/CTFE molar ratio in the copolymer according to the seventh aspect is from 98/2 to 85/15. The fluororesin powder of these VDF/CTFE molar ratios has a low melting temperature and can maintain the flexibility of the fluororesin layer with ease. The VDF molar ratio exceeding the above range results in raising excessively the melting temperature of the fluororesin and results in an increase of the rigidity of the fluororesin layer. Contrarily, the VDF molar ratio not reaching the above range causes excessive reduction in the melting temperature of the fluororesin relative to the temperature of the fuel hose in use, and invites deterioration in resistance to gasoline permeation.

The above and other advantages of the invention will become more apparent from the following description and the accompanying drawing.

DETAILED DESCRIPTION OF THE INVENTION

[Fuel Hose]

The fuel hose of the invention has at least a rubber layer and a fluororesin layer adhering to the inner surface thereof. The fluororesin layer is satisfactorily allowed to adhere to the rubber layer by blending from 2 to 15 phr of a phenol-type resin with rubber forming the rubber layer. The fluororesin layer may or may not form the innermost layer of the fuel hose, but the former case is preferred.

The fluororesin layer may be formed on the entire inner surface of the rubber layer, but also may be formed on the inner surface thereof excluding end portions thereof. In the latter case, since the fluororesin inner layer does not exist at end portions (hose joints) of the hose, sealing at the hose joints is ensured.

The tubular form of the rubber layer and the fluororesin layer constituting the fuel hose is not limited, and they may be of a smooth tubular form or a tubular form with concave and/or convex portions. For example, the rubber layer and the fluororesin layer may be of a corrugated form entirely or in part, or a convex portion or a concave portion of a particular form such as a concave portion for containing a seal ring may be formed on part of the fluororesin layer or the rubber layer.

The rubber layer may be formed as an outermost layer of the fuel hose, or one or more of another rubber layer, a reinforcing fiber layer, a resin layer and the like may be formed in an arbitrary order on the outer surface of the rubber layer. Materials for these layers may be arbitrarily selected according to the respective purposes.

The use of the fuel hose of the invention is not limited. For example, the hose is preferably used as a hose for conveying various fuels for automobiles or other purposes. The hose is particularly preferably used as a hose for conveying gasoline, alcohol-containing gasoline or sour gasoline. The "fuel hose" of the invention includes a hose for conveying hydrogen gas or methanol for fuel cell vehicles.

[Preparation of Fuel Hose]

Figure 1:
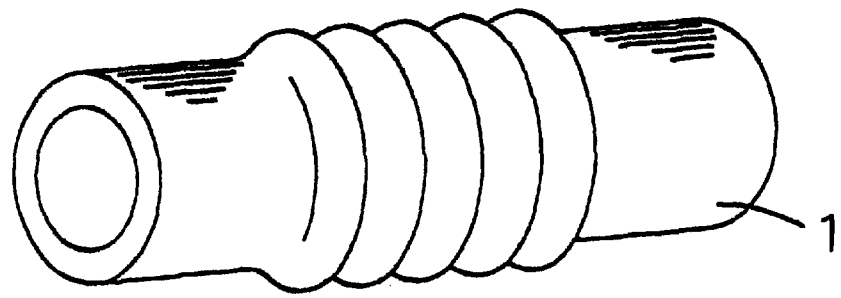
FIG. 1 is a perspective view showing an embodiment of a rubber tube.
Figure 2A:
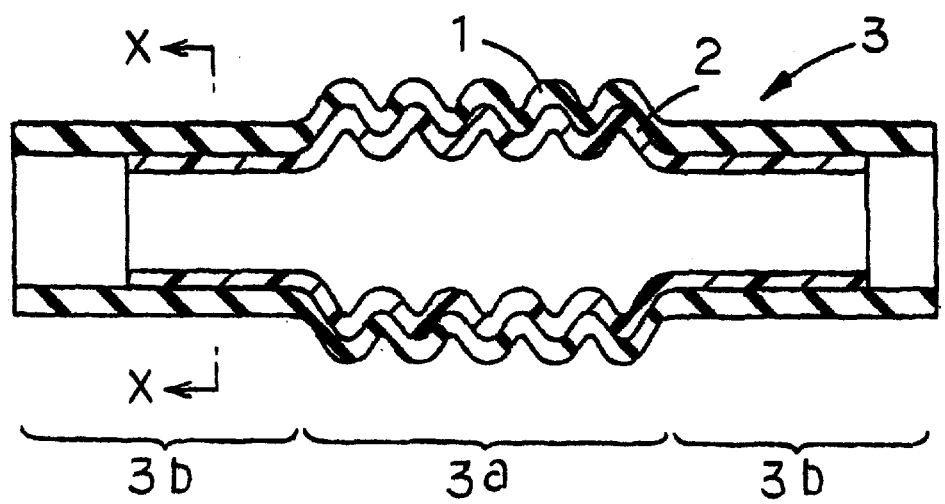
FIG. 2A is a sectional view showing an embodiment of a fuel hose.
Figure 2B:
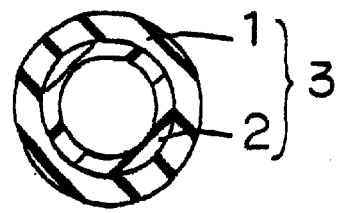
FIG. 2B is a sectional view along the line X—X in FIG. 2A.
Figure 3:
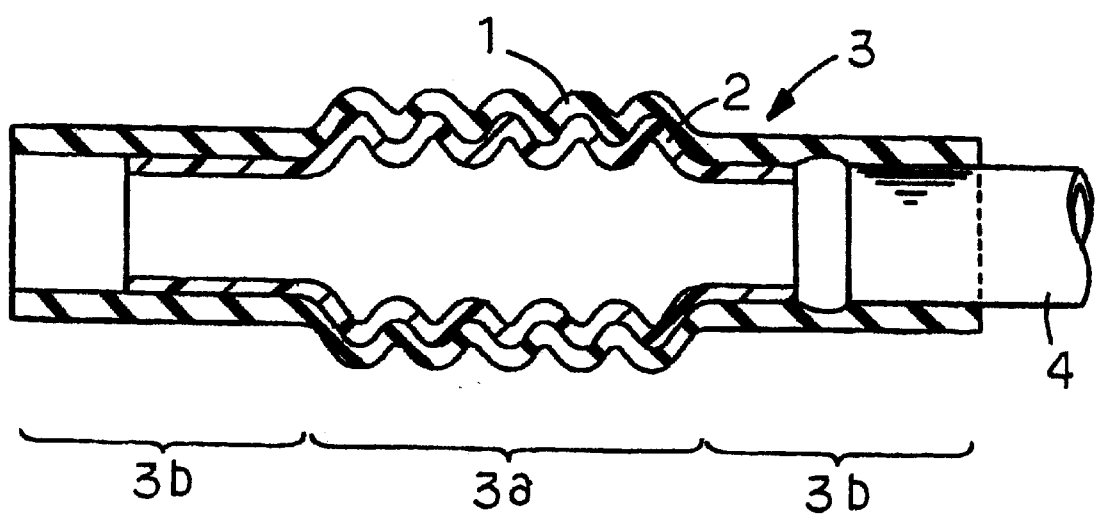
FIG. 3 is a sectional view illustrating the use of a fuel hose.

The process for producing the fuel hose and the use of the fuel hoses according to the present invention are not particularly limited. One example of the process for producing the fuel hose is shown in FIGS. 1, 2A and 2B, one example of a fuel hose in use is shown in FIG. 3. The respective examples relate to fuel hoses that comprise a single fluororesin layer and a single rubber layer and have a cylindrical form at both end portions and a corrugated form at a nearly central portion.

First, an appropriate unvulcanized rubber material blended with from 2 to 15 phr of a phenol-type resin is injected from an injection molding machine, and vulcanized and molded to prepare rubber tube 1 as shown in FIG. 1. Then, a fluororesin powder is allowed to coat the inner surface of rubber tube 1 excluding end portions of a certain length from the openings according to a known arbitrary method for the powder coating. Subsequently, the fluororesin powder is melted with heat and formed into a thin film to prepare fluororesin layer 2.

The heating is carried out, for example, as follows. The rubber tube 1 is placed in an oven and heated totally, or a bar heater is inserted into rubber tube 1 to heat from the inside of the tube. Although heating conditions are appropriately set depending on the respective materials of the fluororesin powder and rubber tube 1, the heating is usually carried out at 150 to 250° C. for two to 60 min. and preferably at 170 to 240° C. for three to 35 min.

The fluororesin powder is melted with the aid of heat and formed into a film. Rubber tube 1 is taken out of the oven and cooled, to thereby obtain fuel hose 3 in which fluororesin layer 2 is formed on a specified portion of the inner surface of rubber tube 1 as shown in FIGS. 2A and 2B. Fuel hose 3 is constituted of a central corrugated portion 3a and cylindrical end portions 3b. As shown in FIG. 3, pipe 4 is inserted into end portion 3b for use as a fuel hose.

The form of the rubber tube is not limited to the corrugated form as shown in FIG. 1, and it may be a straight tube form or a curved tube form. The structure of the rubber tube is not limited to a single-layer structure. The rubber tube may be molded by injection molding or extrusion molding depending on a desired form of the tube. Further, the fluororesin layer may be formed on one or both end portions of the fuel hose as desired.

[Rubber Layer]

Materials of the rubber layer formed on the outer surface of the fluororesin layer are not limited and exemplified by NBR-PVC, epichlorohydrin rubber, NBR, binary or ternary FKM, CPE, and CSM. In addition, examples of other materials include natural rubber, styrene-butadiene rubber, butadiene rubber, isoprene rubber, chloroprene rubber, ethylene-propylene terpolymer, butyl rubber, halogenated butyl rubber, acrylic rubber, silicone rubber, urethane rubber, acrylonitrile butadiene-hydrin rubber blend, acrylonitrile butadiene-ethylene-propylene terpolymer blend, acrylonitrile butadiene -polymethyl methacrylate blend, and acrylonitrile butadiene -polyvinyl acetate blend.

Although the kind of the NBR-PVC used is not limited, the combined acrylonitrile content therein is preferably from 25 to 45% and more preferably from 30 to 40%, and the blended PVC content is from 15 to 40% and particularly preferably from 20 to 35%.

The kind of the epichlorohydrin rubber is not limited, and the rubber usually used for the fuel hose can be arbitrarily selected. Preferably, a homopolymer of epichlorohydrin (CO), a copolymer of epichlorohydrin and ethylene oxide (ECO), or such homopolymer or copolymer copolymerized with allyl glycidyl ether is used.

Although the kind of NBR used is not limited, either, the combined acrylonitrile content therein is preferably from 15 to 45% and more preferably from 25 to 40%.

Although the kind of the fluororubber used is not limited, binary and ternary fluororubbers are preferred. Particularly, copolymers of vinylidene fluoride and hexafluoropropylene, terpolymers of vinylidene fluoride, tetrafluoroethylene, and hexafluoropropylene, copolymers of tetrafluoroethylene and propylene, and blends of polyvinylidene fluoride and acrylic rubber can be used. Although the kind of CPE used is not limited, a chlorine content of from 30 to 40% is appropriate. Although the kind of CSM used is not limited, a chlorine content of from 30 to 40% and a Mooney viscosity of from 40 to 60 are appropriate.

[Phenol-type resins]

From 2 to 15 phr of phenol-type resins are blended with the rubber forming the rubber layer adhering to the fluororesin layer. The phenol-type resin content less than 2 phr may result in reduced adhesion to the fluororesin layer and insufficient resistance to sour gasoline of the rubber layer itself, particularly concerning epichlorohydrin rubber. Exceeding 15 phr may invite deterioration in mechanical properties, compression set, and low-temperature properties although the resistance to sour gasoline of the rubber layer itself is good. The phenol-type resin content is particularly preferably from 2 to 10 phr.

Although the kind of the phenol-type resin used is not limited, examples of the resin used preferably include resol-type phenol resins, novolak-type phenol resins, resorcin resins, resorcin-modified phenol resins, cresol resins, cresol-modified phenol resins, terminal-modified p-alkylphenol-formaldehyde resins, non-thermal reaction alkylphenol resins, thermal reaction phenol resin, cashew-modified phenol resins, aromatic hydrocarbon resin-modified phenol resins, melamine-modified phenol resins, oil-modified phenol resins, terpene-modified phenol resins, and furan-modified phenol resins. These resins may be used singly or as mixtures of two or more thereof. Particularly, the resins represented by formula (1) as described above are preferred in view of excellent adhesion to the fluororesins and property balance of the rubber blends.

[Fluororesin Layer]

The method for forming the fluororesin layer which adhere directly to the inner surface of the rubber layer is not limited as far as the aforesaid adhesion is effectively effected. However, a method where the fluororesin is melted and allowed to adhere to the inner surface of the rubber layer, particularly by powder coating, is preferred.

The fluororesins forming the fluororesin layer are not particularly limited as far as the fluororesins are thermoplastic and have a melting point in the region where the rubber is not deteriorated. Preferable fluororesins are the copolymers of VDF and CTFE. Particularly preferable fluororesins are the copolymers having a VDF/CTFE molar ratio of from 98/2 to 85/15.

Although the thickness of the fluororesin layer is not particularly limited, preferable thickness is from about 0.05 to about 0.5 mm in view of maintenance of the balance between the flexibility of the fuel hose and the resistance to permeation of gasoline thereof.

Embodiments

[Preparation of Fuel Hose]

Fuel hoses having a fluororesin layer and a rubber layer adhering to the outer surface thereof according to examples of the invention and comparative examples were prepared. These fuel hoses have a rubber layer of a single-layer or a multilayer structure.

[Fuel Hose having Rubber Layer of Single-layer Structure]

As shown later in Tables 1, 6, and 7, the fuel hoses according to Examples 1 to 10, Examples 32 to 40, and Comparative Examples 1 and 4 have the rubber layer of a single-layer structure. The compositions of materials of these rubber layers (represented by A1, S1, E1, etc. in the tables) are shown later in the corresponding columns of Tables 8 to 13. The compositions are indicated by phr.

In Examples 1 to 10, Examples 32 to 40, and Comparative Examples 1 and 4, NBR-PVC, epichlorohydrin rubber, CPE, and CSM having compositions as shown in the corresponding columns of Tables 8 to 13 were prepared. These rubber compositions were subjected to vulcanization molding by use of an injection molding machine at 160° C. for five min. to prepare rubber tubes having a single-layer structure of a corrugated form, which had an inner diameter of 35 mm, a wall thickness of 4 mm, and a length of 200 mm.

Subsequently, the inner surfaces of the rubber tubes according to the aforesaid examples and comparative examples (excluding Examples 38 to 40 and Comparative Example 4) underwent the electrostatic powder coating of a fluororesin copolymer powder to form layers of 0.2 mm thickness although these were not described in the tables. The fluororesin copolymer was a VDF-CTFE copolymer having a VDF/CTFE molar ratio of 95/5. The electrostatic coating was carried out through corona discharge (minus charge) of 60 kv/10 μA. These rubber tubes coated with the fluororesin powder were placed in an oven, heated and melted at 210° C. for 25 minutes, and then taken out of the oven to cool. Thus, fuel hoses where the fluororesin layers are formed on the inner surfaces of the rubber tubes were obtained. In Examples 38 to 40 and Comparative Example 4, the aforesaid electrostatic powder coating was not carried out, although vulcanization and molding were carried out under the aforesaid conditions to prepare the rubber tubes.

[Hose having Rubber Layer of Multilayer Structure]

As shown later in Tables 2 to 5, the fuel hoses according to Examples 11 to 31 and Comparative Examples 2 and 3 have the rubber layer of a multilayer structure. In the tables, the term "inner layer" shows a rubber layer adhering to a fluororesin layer, and the term "outer layer" shows a rubber layer on outer side of the inner layer. The compositions (represented by A1, B1, V1, etc. in the tables) of materials of the respective rubber layers of a multilayer structure are shown later in the corresponding columns of Tables 8 to 13.

In these examples 11 to 31 and comparative examples 2 and 3, NBR-PVC, epichlorohydrin rubber, NBR, or binary or ternary FKM having compositions shown in the corresponding columns of Tables 8 to 13 were prepared. First, injection molding accompanying vulcanization was carried out by use of rubber materials having compositions shown in the columns of "inner layer" under the conditions similar to those described in the aforesaid section "Fuel Hose having Rubber Layer of Single-Layer Structure," thus to form inner layers. Subsequently, outer layers were similarly formed by use of the rubber materials having compositions shown in the columns of "outer layer," and thus the rubber tubes of a multilayer structure having a corrugated form were prepared. Herein, the inner diameter of the rubber tubes was 35 mm, the wall thickness was 4 mm, and the length was 200 mm.

The fluororesin layers were formed on the inner surfaces of the rubber tubes according to the aforesaid examples and comparative examples under the conditions similar to those described in the above section to prepare fuel hoses, although these were not described in the tables.

[Evaluation of Fuel Hoses]

For the fuel hoses according to Examples 1 to 37 and Comparative Examples 1 to 3, the adhesion (N/mm) of the rubber layer (the rubber tube) to the fluororesin layer was evaluated according to JIS K 6256.

That is, the end portions of these fuel hoses according to these examples and comparative examples were cut into rings of 25 mm width, and the respective rings were cut open along the axial direction to prepare test samples. From the cut open surface of the test sample, the rubber layer and the fluororesin layer of a certain length were peeled off. The edges of the rubber layer and fluororesin layer peeled were fixed on a tensile testing machine with grips, respectively, and subjected to a tensile test at a tensile strength of 25 mm/min. The peeling strength between the two layers was obtained from the load measured in the tensile test to obtain an "initial" evaluation value.

Next, test gasoline for evaluation, fuel C (mixed liquid of toluene and isooctane of 50:50, by vol %), was confined in the fuel hoses according to the respective same examples and allowed to stand at 40° C. for 72 hours. Subsequently, test samples were prepared from these fuel hoses and underwent the tensile test according to the same process as the above, and the peeling strength obtained was made a evaluation value "after confining fuel."

The adhesion of the rubber layer to the fluororesin layer is evaluated based on the initial evaluation value and the evaluation value after confining fuel of the peeling strength.

In the rubber tubes according to Examples 38 to 40 and Comparative Example 4, moreover, a liquid consisting of FC (mixed liquid of toluene and isooctane of 50:50)/LPO (lauroyl peroxide), being 97/3 in weight percent, was confined at 40° C. for 72 hours. After discharging the liquid, the rubber tubes were cut into half along the axial direction to observe the presence or absence of abnormalities on the inner surfaces. The inner surfaces without abnormality are shown by "○", and those with cracks are shown by "X". The results are shown in the column of "appearance" in Table 7.

TABLE 1

|  |  | Example | | | | | | | | | | Comparative Example |
|---|---|---|---|---|---|---|---|---|---|---|---|---|
|  |  | 1 | 2 | 3 | 4 | 5 | 6 | 7 | 8 | 9 | 10 | 1 |
| Composition of Tubular Rubber of Single-layer Structure |  | A1 | A2 | A3 | A4 | A5 | A6 | A7 | A8 | B9 | B10 | S1 |
| Adhesion (N/mm) | Initial Value | 3.9 | 4.6 | 5.0 | 3.4 | 4.0 | 3.2 | 2.8 | 4.2 | 5.3 | 5.8 | 0.7 |
|  | After confining Fuel | 2.6 | 3.0 | 3.5 | 2.2 | 3.0 | 2.1 | 1.9 | 3.3 | 3.8 | 4.0 | 0.1 |

TABLE 2

|  |  | Example | | | | | | | | |
|---|---|---|---|---|---|---|---|---|---|---|
|  |  | 11 | 12 | 13 | 14 | 15 | 16 | 17 | 18 | 19 |
| Composition of Tubular Rubber | Inner Layer | A1 | B1 | B2 | B3 | B4 | B5 | B6 | B7 | B8 |
|  | Outer Layer | S1 | S1 | S1 | S1 | S1 | S1 | S1 | S1 | S1 |
| Adhesion (N/mm) | Initial Value | 4.1 | 4.4 | 5.8 | 4.0 | 5.1 | 3.9 | 4.8 | 4.5 | 5.1 |
|  | After Confining Fuel | 2.6 | 2.9 | 3.3 | 2.7 | 3.0 | 2.7 | 3.3 | 2.7 | 3.5 |

TABLE 3

|  |  | Example | | | | | |
|---|---|---|---|---|---|---|---|
|  |  | 20 | 21 | 22 | 23 | 24 | 25 |
| Composition of Tubular Rubber | Inner Layer | C1 | C2 | C3 | C4 | C5 | C6 |
|  | Outer Layer | S1 | S1 | S1 | S1 | S1 | S1 |
| Adhesion (N/mm) | Initial Value | 3.9 | 4.2 | 4.8 | 3.0 | 4.5 | 4.6 |
|  | After Confining Fuel | 2.5 | 2.9 | 3.5 | 1.9 | 3.3 | 3.3 |

TABLE 4

|  |  | Example | | | | | |
|---|---|---|---|---|---|---|---|
|  |  | 26 | 27 | 28 | 29 | 30 | 31 |
| Composition of Tubular Rubber | Inner Layer | D1 | D2 | D3 | D4 | D5 | D6 |
|  | Outer Layer | U1 | U1 | U1 | U1 | U1 | U1 |
| Adhesion (N/mm) | Initial Value | 3.0 | 4.7 | 4.3 | 3.5 | 4.0 | 3.1 |
|  | After Confining Fuel | 2.2 | 3.7 | 3.0 | 2.2 | 2.4 | 1.9 |

TABLE 5

|  |  | Comparative Example | |
|---|---|---|---|
|  |  | 2 | 3 |
| Composition of Tubular Rubber | Inner Layer | V1 | U1 |
|  | Outer Layer | T1 | S1 |
| Adhesion (N/mm) | Initial Value | 0.3 | 1.0 |
|  | After Confining Fuel | 0.0 | 0.1 |

TABLE 6

|  | | Example | | | | | |
| --- | --- | --- | --- | --- | --- | --- | --- |
|  | | 32 | 33 | 34 | 35 | 36 | 37 |
| Composition of Tubular Rubber of Single-layer Structure | | E1 | E2 | E3 | F1 | F2 | F3 |
| Adhesion (N/mm) | Initial Value | 3.2 | 4.5 | 3.3 | 3.0 | 4.4 | 2.9 |
|  | After Confining Fuel | 2.0 | 2.8 | 2.0 | 1.9 | 2.4 | 2.0 |

TABLE 7

|  | Example | | | Comparative Example |
| --- | --- | --- | --- | --- |
|  | 38 | 39 | 40 | 4 |
| Composition of Tubular Rubber of Single-layer Structure | B1 | B8 | B9 | T1 |
| Appearance | o | o | o | × |

FC (toluene/isooctane = 50/50)/LPO (lauroyl peroxide) (= 97/3 in weight percent) was confined in the respective rubber tubes of single-layer structure at 40° C. for 72 hours, and after discharging the liquid, the tubes were cut in half to observe the presence or absence of abnormality on the inner surfaces. o : No abnormality x: Crack developed

TABLE 8

|  | A1 | A2 | A3 | A4 | A5 | A6 | A7 | A8 | S1 |
| --- | --- | --- | --- | --- | --- | --- | --- | --- | --- |
| NBR-PVC*[1] | 100 | 100 | 100 | 100 | 100 | 100 | 100 | 100 | 100 |
| Stearic Acid | 0.7 | 0.7 | 0.7 | 0.7 | 0.7 | 0.7 | 0.7 | 0.7 | 0.7 |
| Zinc Oxide | 3 | 3 | 3 | 3 | 3 | 3 | 3 | 3 | 3 |
| Carbon Black GPF | 60 | 60 | 60 | 60 | 60 | 60 | 60 | 60 | 60 |
| Calcium Carbonate | 20 | 20 | 20 | 20 | 20 | 20 | 20 | 20 | 20 |
| Plasticizer | 30 | 30 | 30 | 30 | 30 | 30 | 30 | 30 | 30 |
| Resin Represented by Formula (1) | 5 | 10 | 15 |  |  |  |  | 5 |  |
| Cashew-Modified Phenol Resin |  |  |  | 5 | 10 |  |  |  |  |
| Oil-Modified Phenol Resin |  |  |  |  |  | 5 |  |  |  |
| Phenol Resin |  |  |  |  |  |  | 2 | 2 |  |
| Sulfur | 1.5 | 1.5 | 1.5 | 1.5 | 1.5 | 1.5 | 1.5 | 1.5 | 1.5 |
| MBTS | 1.5 | 1.5 | 1.5 | 1.5 | 1.5 | 1.5 | 1.5 | 1.5 | 1.5 |
| Tetrakis(2-ethylhexyl)thiuram Disulfide | 1.5 | 1.5 | 1.5 | 1.5 | 1.5 | 1.5 | 1.5 | 1.5 | 1.5 |

*[1]NBR/PVC = 70/30 (in weight ratio), Combined acrylonitrile content: 35

TABLE 9

|  | B1 | B2 | B3 | B4 | B5 | B6 | B7 | B8 | B9 | B10 | T1 |
| --- | --- | --- | --- | --- | --- | --- | --- | --- | --- | --- | --- |
| Epichlorohydrin Rubber | 100 | 100 | 100 | 100 | 100 | 100 | 100 | 100 | 100 | 100 | 100 |
| Stearic Acid | 1 | 1 | 1 | 1 | 1 | 1 | 1 | 1 | 1 | 1 | 1 |
| Magnesium Oxide |  |  |  |  | 5 | 5 | 5 | 5 | 2 | 2 |  |
| Red Lead |  |  | 5 | 5 |  |  |  |  |  |  |  |
| Carbon Black | 40 | 40 | 40 | 40 | 40 | 40 | 40 | 40 | 40 | 40 | 40 |
| Basic Silica | 10 | 10 | 10 | 10 | 10 | 10 | 10 | 10 | 5 | 5 | 10 |
| Calcium Carbonate | 10 | 10 | 10 | 10 | 10 | 10 | 10 | 10 |  |  | 10 |
| Filler |  |  |  |  |  |  |  |  | 30 | 30 |  |
| Plasticizer | 5 | 5 | 5 | 5 | 5 | 5 | 5 | 5 | 5 | 5 | 5 |
| Carbamate-Series Aging Preventive | 1 | 1 | 1 | 1 | 1 | 1 | 1 | 1 | 1 | 1 | 1 |
| Resin Represented by Formula (1) | 5 | 15 |  |  |  | 5 |  | 5 | 5 | 10 |  |
| Cashew-Modified Phenol Resin |  |  | 10 |  |  |  | 10 | 5 |  |  |  |
| Oil-Modified Phenol Resin |  |  |  | 15 |  |  | 2 |  |  |  |  |
| Phenol Resin |  |  |  |  | 10 | 5 |  |  |  |  |  |
| Hydrotalcite | 9 | 9 |  |  |  |  |  |  |  |  | 9 |
| 6-Methylquinoxaline-2,3-dithiocarbamate | 1.5 | 1.5 |  |  |  |  |  |  |  |  | 1.5 |
| Ethylene Thiourea |  |  | 1.5 | 1.5 |  |  |  |  | 0.5 | 0.5 |  |
| Sulfur |  |  |  |  |  |  |  |  | 0.1 | 0.1 |  |
| 2,2'-Dibenzamidodiphenyl Disulfide |  |  |  |  |  |  |  |  | 1 | 1 |  |
| Polyol |  |  |  |  | 1.5 | 1.5 |  |  |  |  |  |
| 4,4'-Diaminodiphenyl ether |  |  |  |  |  |  | 3 |  |  |  |  |
| N,N'-Dicinnamylidene-1,6-hexanediamine |  |  |  |  |  |  |  | 3 |  |  |  |

TABLE 10

|  | C1 | C2 | C3 | C4 | C5 | C6 | U1 |
|---|---|---|---|---|---|---|---|
| NBR | 100 | 100 | 100 | 100 | 100 | 100 | 100 |
| Zinc Oxide | 5 | 5 | 5 | 5 | 5 | 5 | 5 |
| Stearic Acid | 1 | 1 | 1 | 1 | 1 | 1 | 1 |
| Basic Silica | 20 | 20 | 20 | 20 | 20 | 20 | 20 |
| Carbon Black FEF | 35 | 35 | 35 | 35 | 35 | 35 | 35 |
| Carbon Black SRF | 30 | 30 | 30 | 30 | 30 | 30 | 30 |
| Plasticizer | 25 | 25 | 25 | 25 | 25 | 25 | 25 |
| Resin Represented by Formula (1) | 2 |  | 10 |  |  | 5 |  |
| Cashew-Modified Phenol Resin |  | 5 |  |  |  |  |  |
| Oil-Modified Phenol Resin |  |  |  | 2 | 15 |  |  |
| Phenol Resin |  |  |  |  |  |  | 5 |
| Sulfur | 0.5 | 0.5 | 0.5 | 0.5 | 0.5 | 0.5 | 0.5 |
| TETD | 2.1 | 2.1 | 2.1 | 2.1 | 2.1 | 2.1 | 2.1 |
| CBS | 1.2 | 1.2 | 1.2 | 1.2 | 1.2 | 1.2 | 1.2 |
| Peroxide | 4.5 | 4.5 | 4.5 | 4.5 | 4.5 | 4.5 | 4.5 |

TABLE 11

|  | D1 | D2 | D3 | D4 | D5 | D6 | V1 |
|---|---|---|---|---|---|---|---|
| FKM (Binary) | 100 | 100 |  |  | 100 | 100 | 100 |
| FKM (Ternary) |  |  | 100 | 100 |  |  |  |
| Magnesium Oxide | 3 | 3 | 3 | 3 | 3 | 3 | 3 |
| Carbon Black MT | 20 | 20 | 20 | 20 | 20 | 20 | 20 |
| Resin Represented by Formula (1) | 2 | 10 | 10 |  |  |  |  |
| Cashew-Modified Phenol Resin |  |  |  | 5 |  |  |  |
| Oil-Modified Phenol Resin |  |  |  |  | 15 |  |  |
| Phenol Resin |  |  |  |  |  | 2 |  |
| Calcium Hydroxide | 6 | 6 | 6 | 6 | 6 | 6 | 6 |

TABLE 12

|  | E1 | E2 | E3 |
|---|---|---|---|
| CPE | 100 | 100 | 100 |
| Plasticizer | 20 | 20 | 20 |
| Carbon Black SRF | 50 | 50 | 50 |
| Epoxy Resin | 5 | 5 | 5 |
| Resin Represented by Formula (1) | 2 | 10 |  |
| Cashew-Modified Phenol Resin |  |  | 5 |
| Peroxide | 5 | 5 | 5 |
| Triallyl Isocyanurate | 3 | 3 | 3 |

TABLE 13

|  | F1 | F2 | F3 |
|---|---|---|---|
| CSM | 100 | 100 | 100 |
| Epoxy Resin | 15 | 15 | 15 |
| Carbon Black SRF | 40 | 40 | 40 |
| Resin Represented by Formula (1) | 2 | 10 |  |
| Cashew-Modified Phenol Resin |  |  | 5 |
| MBTS | 0.5 | 0.5 | 0.5 |
| DPTT | 1.5 | 1.5 | 1.5 |
| DOTG | 0.25 | 0.25 | 0.25 |

While the preferred embodiments have been described, variations thereto will occur to those skilled in the art within the scope of the present inventive concepts which are delineated by the following claims.

What is claimed is:

1. A fuel hose comprising a rubber layer and a fluororesin layer adhering to an inner surface of the rubber layer, wherein rubber forming the rubber layer contains from 2 to 15 phr (parts per 100 parts of rubber) of a phenol-type resin.

2. The fuel hose according to claim 1, wherein the fluororesin layer is formed by melting a fluororesin and allowing it to adhere to the inner surface of the rubber layer by powder coating.

3. The fuel hose according to claim 1, wherein the thickness of the fluororesin layer is from 0.05 to 0.5 mm.

4. The fuel hose according to claim 1, wherein the fluororesin layer is an innermost layer of the fuel hose.

5. The fuel hose according to claim 1, wherein the fluororesin layer is formed on the inner surface of the rubber layer excluding end portions of the inner surface.

6. The fuel hose according to claim 1, wherein the content of the phenol-type resin is from 2 to 10 phr.

7. The fuel hose according to claim 1, wherein the phenol-type resin is at least one resin selected from the group consisting of a resol-type phenol resin, a novolak-type phenol resin, a resorcin resin, a resorcin-modified phenol resin, a cresol resin, a cresol-modified phenol resin, a terminal-modified p-alkylphenol-formaldehyde resin, a non-thermal reaction alkylphenol resin, a thermal reaction phenol resin, a cashew-modified phenol resin, an aromatic hydrocarbon resin-modified phenol resin, a melamine-modified phenol resin, an oil-modified phenol resin, a terpene-modified phenol resin, and a furan-modified phenol resin.

8. The fuel hose according to claim 1, wherein the phenol-type resin is a resin represented by the following formula:

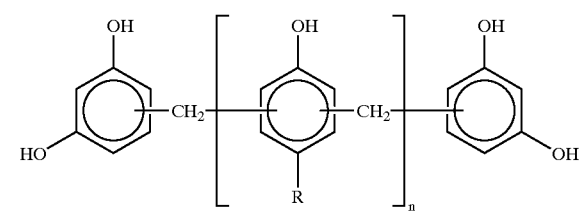

wherein R represents a hydrocarbon group, and n is a positive integer.

9. The fuel hose according to claim 1, wherein the rubber forming the rubber layer is NBR-PVC, epichlorohydrin rubber, NBR, or binary or ternary FKM, CPE, or CSM.

10. The fuel hose according to claim 9, wherein the NBR-PVC has a combined acrylonitrile content of from 25 to 45%, and a blended PVC content of from 15 to 40%.

11. The fuel hose according to claim 9, wherein the epichlorohydrin rubber is CO, ECO, or CO or ECO copolymerized with allyl glycidyl ether.

12. The fuel hose according to claim 9, wherein the NBR has the combined acrylonitrile content of from 15 to 45%.

13. The fuel hose according to claim 9, wherein the fluororubber is a copolymer of vinylidene fluoride and hexafluoropropylene, a terpolymer of vinylidene fluoride, tetrafluoroethylene, and hexafluoropropylene, a copolymer of tetrafluoroethylene and propylene, or a blended product of polyvinylidene fluoride and acrylic rubber.

14. The fuel hose according to claim 1, wherein the rubber forming the rubber layer is natural rubber, styrene butadiene rubber, butadiene rubber, isoprene rubber, chloroprene rubber, an ethylene propylene terpolymer, butyl rubber, halogenated butyl rubber, acrylic rubber, silicone rubber, urethane rubber, an acrylonitrile butadiene/hydrin rubber blend, an acrylonitrile butadiene/ethylenepropylene terpolymer blend, an acrylonitrile butadiene/polymethyl methacrylate blend, or an acrylonitrile butadiene/polyvinyl acetate blend.

15. The fuel hose according to claim 1, wherein a material of the fluororesin layer is a copolymer of vinylidene fluoride (VDF) and chlorotrifluoroethylene (CTFE).

16. The fuel hose according to claim 15, wherein a VDF/CTFE molar ratio is from 98/2 to 85/15.

17. The fuel hose according to claim 1, wherein the fuel hose has a smooth tubular form or a tubular form with concave and/or convex portions.

18. The fuel hose according to claim 17, wherein the tubular form with concave and/or convex portions is a corrugated form along a whole or partial length of the fuel hose, or a tubular form with a concave portion for containing a seal ring in part of the fluororesin layer.

19. The fuel hose according to claim 1, wherein the rubber layer is formed as an outermost layer of the fuel hose, or one or more of another rubber layer, a reinforcing fiber layer and a resin layer are formed in an arbitrary order on the outer surface of the rubber layer.

20. The fuel hose according to claim 1, which is a fuel hose for conveying gasoline, alcohol-containing gasoline, or sour gasoline.

* * * * *